United States Patent
Hirata et al.

(10) Patent No.: US 11,240,845 B2
(45) Date of Patent: Feb. 1, 2022

(54) COMMUNICATION DEVICE, PROGRAM, AND COMMUNICATION METHOD RELATED TO FRAME EXCHANGE

(71) Applicant: Sony Corporation, Tokyo (JP)

(72) Inventors: Ryuichi Hirata, Kanagawa (JP); Yuichi Morioka, Kanagawa (JP); Kosuke Aio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/763,997

(22) PCT Filed: Oct. 5, 2018

(86) PCT No.: PCT/JP2018/037359
§ 371 (c)(1),
(2) Date: May 14, 2020

(87) PCT Pub. No.: WO2019/102724
PCT Pub. Date: May 31, 2019

(65) Prior Publication Data
US 2020/0288500 A1    Sep. 10, 2020

(30) Foreign Application Priority Data

Nov. 24, 2017  (JP) .............................. JP2017-226116

(51) Int. Cl.
*H04W 4/00*    (2018.01)
*H04W 74/08*   (2009.01)
(Continued)

(52) U.S. Cl.
CPC ....... *H04W 74/0816* (2013.01); *H04W 28/20* (2013.01); *H04W 72/0453* (2013.01); *H04W 76/15* (2018.02)

(58) Field of Classification Search
None
See application file for complete search history.

(56) References Cited

U.S. PATENT DOCUMENTS

2012/0163360 A1    6/2012  Cheong et al.
2015/0288427 A1*  10/2015  Wang ................ H04W 72/1284
                                                   370/329
(Continued)

FOREIGN PATENT DOCUMENTS

JP    2006-246142 A    9/2006
JP    2010-109933 A    5/2010
(Continued)

OTHER PUBLICATIONS

International Search Report and Written Opinion dated Dec. 11, 2018 for PCT/JP2018/037359 filed on Oct. 5, 2018, 9 pages including English Translation of the International Search Report.

*Primary Examiner* — Suhail Khan
(74) *Attorney, Agent, or Firm* — Xsensus LLP

(57) ABSTRACT

[Problem] To provide a communication device that enable performing radio communication in a more efficient manner.

[Solution] A communication device includes a first communication unit that performs frame exchange with another communication device using a first channel and based on the IEEE802.11 standard; a second communication unit that performs communication of data frames with the other communication device using a second channel which has a different frequency band than the first channel; and a control unit that controls communication of the data frames based on the result of the frame exchange.

3 Claims, 13 Drawing Sheets

(51) Int. Cl.
*H04W 76/15* (2018.01)
*H04W 28/20* (2009.01)
*H04W 72/04* (2009.01)

(56) References Cited

U.S. PATENT DOCUMENTS

2015/0312386 A1 10/2015 Lee et al.
2017/0041798 A1 2/2017 Li et al.
2017/0310420 A1 10/2017 Kasher
2018/0205502 A1* 7/2018 Merlin .................. H04L 5/0053

FOREIGN PATENT DOCUMENTS

| JP | 2010-252049 A | 11/2010 |
| JP | 2012-513715 A | 6/2012 |
| JP | 2014-502453 A | 1/2014 |
| JP | 2014-504089 A | 2/2014 |
| WO | 2006/000955 A1 | 1/2006 |

\* cited by examiner

FIG.4

| Frame Control | Duration | RA | TA | Format of Data | BSS Color of Data | Spatial Reuse of Data | Bandwidth of Data | Duration of Data | FCS |

FIG.5

| Frame Control | RA | Transmit Start Time of Data | Duration of Data | FCS |
|---|---|---|---|---|

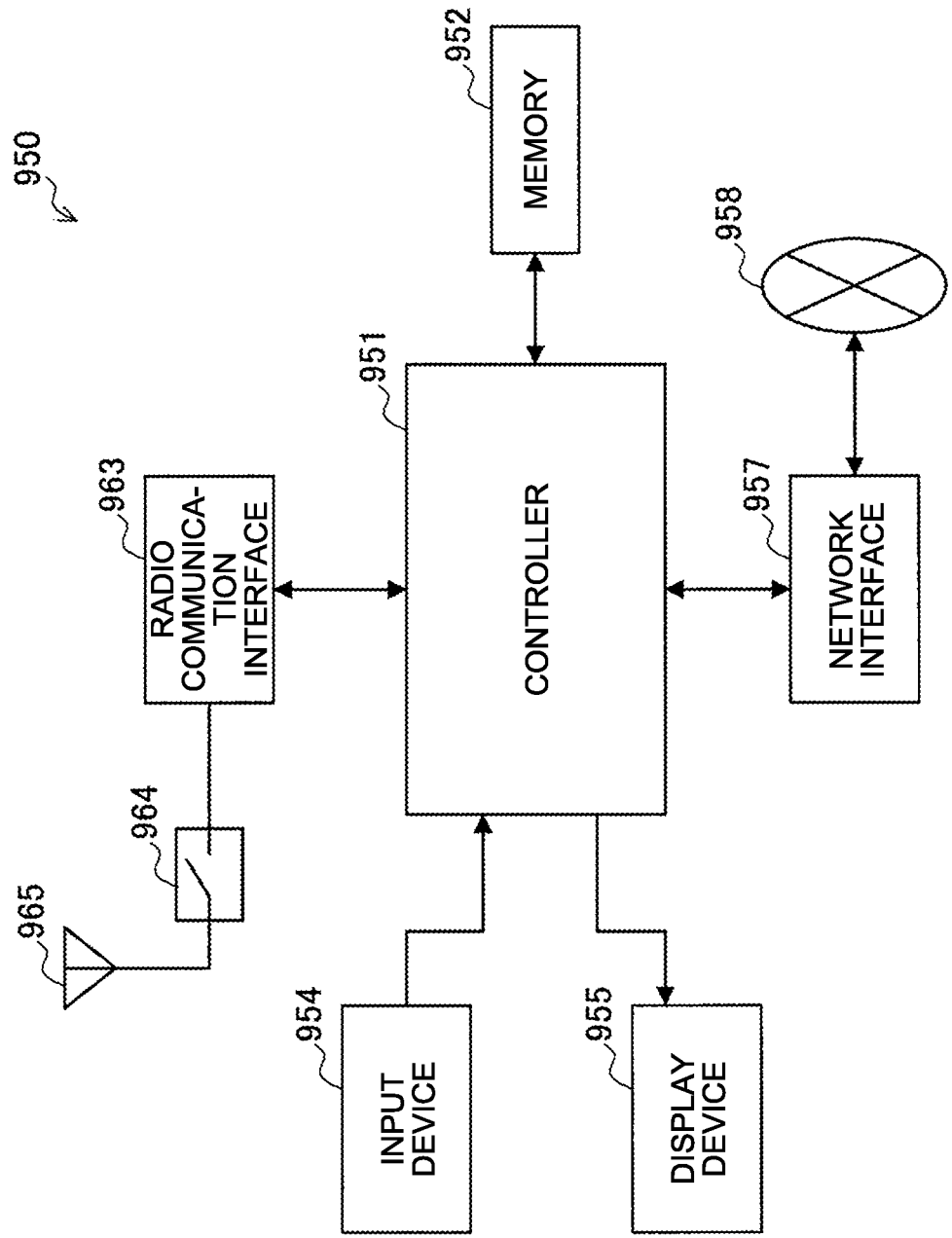

COMMUNICATION DEVICE, PROGRAM, AND COMMUNICATION METHOD RELATED TO FRAME EXCHANGE

CROSS-REFERENCE TO RELATED APPLICATIONS

The present application is based on PCT filing PCT/JP2018/037359, filed Oct. 5, 2018, which claims priority to JP 2017-226116, filed Nov. 24, 2017, the entire contents of each are incorporated herein by reference.

FIELD

The application concerned is related to a communication device, a program, and a communication method.

BACKGROUND

In the IEEE802.11 standard, access control of a number of terminals is performed according to CSMA/CA (Carrier Sense Multiple Access with Collision Avoidance). The access control is performed using RTS/CTS frame exchange and, at the time of performing the access control, some period of time is taken for the RTS/CTS frame exchange and some period of time is taken as the latency time prior to data transmission. The time taken by the access control sometimes accounts for the major portion of the communication time, and can be a significant overhead in the communication. Moreover, since the frames used in the access control are transmitted in a narrower band frequency than the band frequency used for transmitting data frames, the transmission of control frames results in a decline in the frequency usage efficiency. In that regard, a technology has been developed in which a channel that is different than the channel for data transmission is also used.

For example, in Patent Literature 1, a method has been disclosed in which the channel for data transmission is used along with a tone channel representing the channel different than the channel for data transmission. In the method disclosed in Patent Literature 1, as a result of transmitting and receiving signals meant for confirming responses among the devices, the tone channel confirms the usage status of the data channel. Each terminal performs carrier sensing with respect to the tone channel, and becomes able to determine whether the data channel is available.

CITATION LIST

Patent Literature

Patent Literature 1: JP 2006-246142 A

SUMMARY

Technical Problem

However, since the access control for acquiring the data transmission right as disclosed in Patent Literature 1 is performed according to the normal back-off control via the data channel and according to the RTS/CTS frame exchange, there is no reduction in the overhead occurring during the access control.

In that regard, the application concerned is made in view of the issues mentioned above, and a communication device, a program, and a communication method in a new and improved form are provided that enable performing radio communication in a more efficient manner.

Solution to Problem

According to the present disclosure, a communication device is provided that includes: a first communication unit that performs frame exchange with other communication device using a first channel and based on IEEE802.11 standard; a second communication unit that performs communication of data frame with the other communication device using a second channel which has different frequency band than the first channel; and a control unit that controls communication of the data frame based on result of the frame exchange.

Moreover, according to the present disclosure, a program is provided that causes a computer to function as: a first communication unit that performs frame exchange with other communication device using a first channel and based on IEEE802.11 standard; a second communication unit that performs communication of data frame with the other communication device using a second channel which has different frequency band than the first channel; and a control unit that controls communication of the data frame based on result of the frame exchange.

Moreover, according to the present disclosure, a communication method implemented in a processor is provided that includes: performing frame exchange with other communication device using a first channel and based on IEEE802.11 standard; performing communication of data frame with the other communication device using a second channel which has different frequency band than the first channel; and controlling communication of the data frame based on result of the frame exchange.

Advantageous Effects of Invention

As explained above, according to the application concerned, it becomes possible to perform radio communication in a more efficient manner.

Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 4 is a diagram illustrating an example of the format of an RTS frame according to the embodiment of the application concerned.

FIG. 5 is a diagram illustrating an example of the format of a CTS frame according to the embodiment of the application concerned.

FIG. 13 is a block diagram illustrating an example of a schematic configuration of a wireless access point.

DESCRIPTION OF EMBODIMENTS

Figure 1:
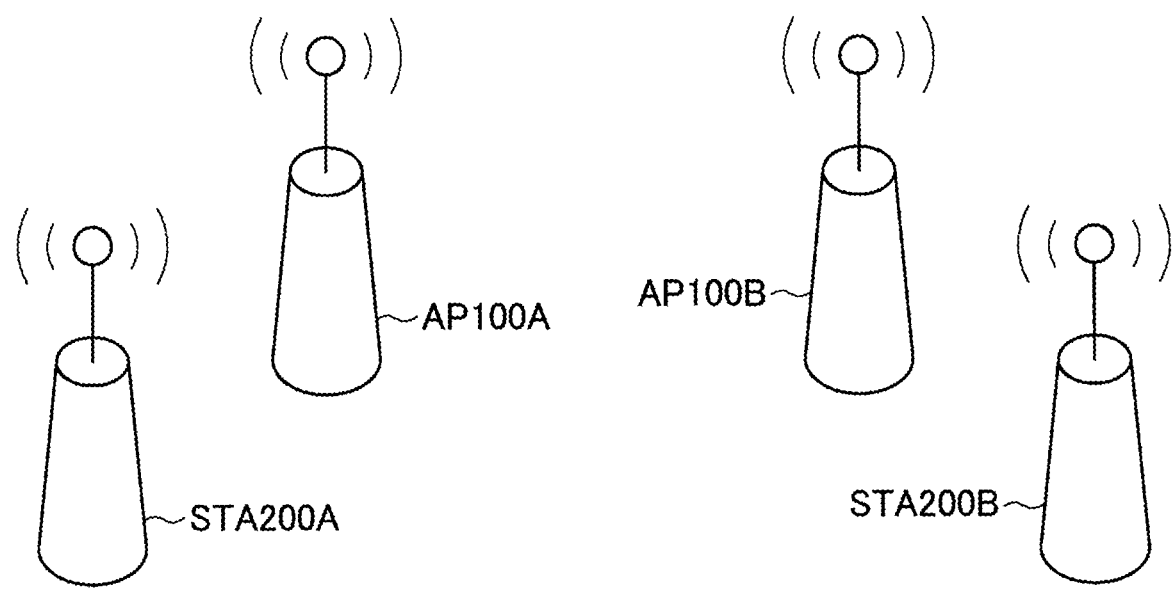
FIG. 1 is a diagram illustrating a configuration of a communication system according to an embodiment of the application concerned.

A preferred embodiment of the application concerned is described below in detail with reference to the accompanying drawings. In the present written description and the drawings, the constituent elements having practically identical functional configuration are referred to by the same reference numerals, and the corresponding explanation is not given repeatedly.

The explanation is given in the following sequence.
1. Overview of communication system
2. Embodiment of application concerned
  2-1. Functional overview
  2-2. Functional configuration example
  2-3. Communicated information
  2-4. Operation example
3. Modification example
4. Application examples
5. Summary <1. Overview of Communication System>

Firstly, explained below with reference to FIG. 1 is a configuration of a communication system according to the embodiment of the application concerned. As illustrated in FIG. 1, the communication system according to the application concerned is a wireless LAN system (for example, a wireless LAN system compatible to the IEEE802.11 standard), and is configured with APs (Access Points) 100, which represent the base stations of communication devices, and STAs (Stations) 200, which represent child devices. With reference to FIG. 1, an STA 200A represents the child device of an AP 100A, and an STA 200B represents the child device of an AP 100B.

The AP 100A is a communication device functioning as a base station in the wireless LAN system. For example, the AP 100A gets connected with an external network, and enables the STA 200A to communicate with that external network. For example, the AP 100A gets connected to the Internet, and enables the STA 200A to communicate with devices on the Internet or devices that get connected to the Internet. Herein, there is no particular restriction on the communication, the type, and the shape of the AP 100A. The AP 100B has identical functions to the functions of the AP 100A, and the explanation thereof is not given so as to avoid repetition.

The STA 200A functions as a child device in the wireless LAN system, and is a communication device that performs communication with the AP 100A. For example, the STA 200A can be an arbitrary device such as a display having the display function, a memory having the storage function, a keyboard and a mouse having the input function, a speaker having the sound output function, or a smartphone having the function of performing sophisticated calculations. Herein, there is no particular restriction on the communication method, the type, and the shape of the STA 200A. The STA 200B has identical functions to the functions of the STA 200B, and the explanation thereof is not given so as to avoid repetition.

In the following specific explanation of the embodiment of the application concerned, for example, the explanation is given about the relationship between the transmission and reception of data performed between the AP 100A and the STA 200A and the transmission and reception of data performed between the AP 100B and the STA 200B.

<2. Embodiment of Application Concerned>

[2-1. Functional Overview]

In the embodiment of the application concerned, at the time of transmitting data to another communication device, the concerned communication device performs frame exchange based on the IEEE802.11 standard and accordingly determines whether or not to transmit data (data frames). More particularly, at the time of transmitting data frames to the STA 200, the AP 100 performs RTS/CTS frame exchange with the STA 200, and attempts to acquire the transmission right for transmitting data frames. Based on whether or not the transmission right for transmitting data frames could be acquired as a result of performing the RTS/CTS frame exchange, the AP 100 determines whether or not to transmit data frames to the STA 200.

The RTS/CTS frame exchange implies exchanging RTS (Request to Send) frames and CTS (Clear to Send) frames between communication devices. As a result of performing the RTS/CTS frame exchange, it becomes possible for the communication devices to confirm the presence of each other, and to transmit and receive data frames in an appropriate manner. Particularly, the RTS/CTS frame exchange is used as a countermeasure against the hidden-terminal problem. An RTS frame is a frame (first-type frame) including transmission request information, and a CTS frame is a frame (second-type frame) including transmission permission information.

In the embodiment of the application concerned, at the time of performing frame exchange and data transmission, a communication device uses channels having different frequency bands. For example, at the time of performing the RTS/CTS frame exchange, the AP 100 uses the channel having the frequency band of 5 GHz (a first channel) as the control channel. Moreover, at the time of transmitting data frames, the AP 100 uses the channel having the frequency band of 6 GHz (a second channel) as the data channel.

Herein, there is no particular restriction on the usage of the first channel and the second channel. For example, the AP 100 can use the first channel having the frequency band of 5 GHz as the data channel, and can use the second channel having the frequency band of 6 GHz as the control channel.

In the embodiment of the application concerned, the control channel having the frequency band of 5 GHz has a narrow bandwidth (for example, 20 MHz), and serves as the channel used by the communication devices to communicate control information. The data channel having the frequency band of 6 GHz has a wide bandwidth (for example, 160 MHz), and serves as the channel used by the communication devices to communicate data frames. However, the role of each channel is set by taking into account the usage efficiency of the frequency bands; and, depending on the usage status of the resources, there is no restriction on the roles of the channels. For example, if the usage status of the control channel indicates congestion, the communication devices can communicate the control information via the data channel. Moreover, there is no particular restriction on the bandwidths of the channels, and each channel can have an arbitrary bandwidth.

Till now, the explanation was given about the functional overview of the communication devices according to the embodiment of the application concerned. Given below is the explanation of a functional configuration example of the communication device according to the embodiment of the application concerned.

[2-2. Functional Configuration Example]

Figure 2:
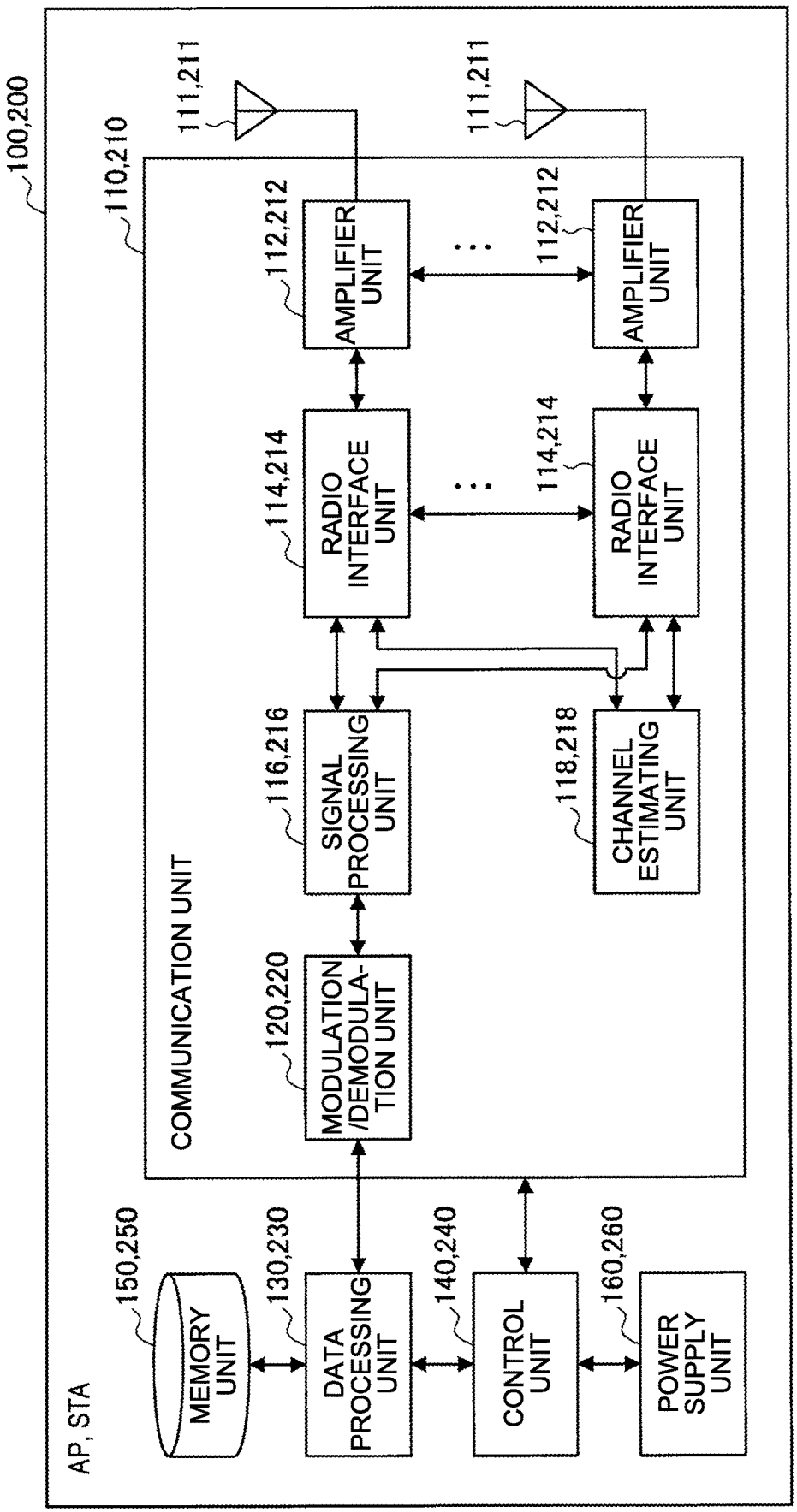
FIG. 2 is a block diagram illustrating a functional configuration example of a communication device according to the embodiment of the application concerned.

Explained below with reference to FIG. 2 is a functional configuration example of the communication device according to the embodiment. FIG. 2 is a block diagram illustrating a functional configuration example of the communication device. Herein, the communication device either implies the AP 100 as well as the STA 200, or implies either one of the AP 100 and the STA 200. Moreover, since the AP 100 and the STA 200 can have an identical functional configuration, the following explanation is given only about the functional configuration of the AP 100, and the explanation of the functional configuration of the STA 200 is not given. Furthermore, since the explanation is only exemplary, the AP 100 and the STA 200 can have different functional configurations. For example, the AP 100 can separately have the function of controlling a plurality of STAs 200.

As illustrated in FIG. 2, the AP 100 includes a communication unit 110, antennas 111, a data processing unit 130, a control unit 140, a memory unit 150, and a power supply unit 160.

(1) Communication Unit 110

The communication unit 110 functions as a transmitting unit and a receiving unit; and has the function of transmitting RTS frames, CTS frames, and data frames to other communication devices, and receiving those frames from other communication devices. The communication unit 110 according to the embodiment of the application concerned includes amplifier units 112, radio interface units 114, a signal processing unit 116, a channel estimating unit 118, and a modulation/demodulation unit 120. If one amplifier unit 112 and one radio interface unit 114 are treated as one set, the communication unit 110 can include two or more such sets (in the example illustrated in FIG. 2, two or more sets are included). Alternatively, the functions of the amplifier units 112 can be included in the radio interface units 114.

In the embodiment of the application concerned, the AP 100 includes at least two sets of configurations each including the antenna 111 along with the amplifier unit 112 and the radio interface unit 114 of the communication unit 110. Moreover, for example, one set of the antenna 111, the amplifier unit 112, and the radio interface unit 114 is treated as the set used in the control channel (a first communication unit), and the other set is treated as the set used in the data channel (a second communication unit). When a communication device performs the RTS/CTS frame exchange with another communication device, the first communication units are used by the communication devices for transmitting and receiving RTS frames and CTS frames. Moreover, when a communication device transmits data frames to and receives data frames from another communication device, the second communication units are used by the communication devices for transmitting and receiving data frames.

Meanwhile, the communication unit 110 need not keep the first communication unit, which is used in the control channel, and the second communication unit, which is used in the data channel, operational on a constant basis; and can keep only one of the first communication unit and the second communication unit operational depending on the operations to be performed. For example, at the time of performing operations for the RTS/CTS frame exchange, the communication unit 110 can keep only the first communication unit operational; and, at the time of performing operations for transmitting and receiving data frames, the communication unit 110 can keep only the second communication unit operational. Moreover, the communication unit 110 of the communication device at the data frame transmitting side can keep only the first communication unit operational on a constant basis, and can make the second communication unit operational only upon receiving CTS data frames from the communication unit 110 of the communication device at the data frame receiving side. In an identical manner, the communication unit 110 of the communication device at the data frame receiving side can keep only the first communication unit operational on a constant basis, and can make the second communication unit operational only at the time transmitting CTS frames to the communication unit 110 of the communication device at the data frame transmitting side. In this way, by controlling the operational status of the first communication unit and the second communication unit, the communication device can reduce the power consumption.

(Amplifier Unit 112)

Each amplifier unit 112 performs signal amplification. More particularly, during reception, the amplifier unit 112 amplifies the received signals, which are input from the antenna 111, up to a predetermined electrical power; and outputs the amplified signals to the corresponding radio interface unit 114 (described later). On the other hand, during transmission, the amplifier unit 112 amplifies the transmission signals, which are input from the radio interface unit 114, up to a predetermined electrical power; and outputs the amplified signals to the corresponding antenna 111. Meanwhile, it is alternatively possible to make the radio interface unit 114 implement these functions.

(Radio Interface Unit 114)

During reception, the radio interface unit 114 obtains baseband signals by down-converting the received signals, which are analog signals, provided from the corresponding amplifier unit 112; generates reception symbol streams by performing a variety of processing, such as filtering and conversion into digital signals, with respect to the baseband signals; and outputs the reception symbol streams to the signal processing unit 116 (described later). On the other hand, during transmission, the radio interface unit 114 converts the input from the signal processing unit 116 into analog signals; performs filtering and up-conversion to carrier frequency bands; and outputs the processed signals to the amplifier unit 112.

(Signal Processing Unit 116)

During reception, the signal processing unit 116 performs spatial processing with respect to the reception symbol streams provided from each radio interface unit 114; obtains an independent data symbol stream for each reception symbol stream; and provides the data symbol streams to the modulation/demodulation unit 120 (described later). On the other hand, during transmission, the signal processing unit 116 performs spatial processing with respect to the data symbol streams input from the modulation/demodulation unit 120, and provides one or more obtained transmission symbol streams to each radio interface unit 114.

(Channel Estimating Unit 118)

The channel estimating unit 118 calculates complex channel gain information of the propagation channel from the preamble part and the training signal part of the received signals provided from each radio interface unit 114. The calculated complex channel gain information is used in the demodulation operation performed by the modulation/demodulation unit 120 and in the spatial processing performed by the signal processing unit 116.

(Modulation/Demodulation Unit 120)

During reception, the modulation/demodulation unit 120 obtains received data by performing demodulation, de-interleaving, and decoding with respect to the data symbol streams provided from the signal processing unit 116; and provides the received data to the data processing unit 130. On the other hand, during transmission, with respect to the frames provided from the data processing unit 130, the modulation/demodulation unit 120 performs encoding, interleaving, and modulation based on the coding and the modulation method set by the control unit 140 (described later), and generates data symbol streams; and provides them to the signal processing unit 116.

(2) Antenna 111

Each antenna 111 includes one or more antenna elements; and has the function of outputting the received signals from other communication devices to the corresponding amplifier unit 112; and has the function of transmitting the transmission signals, which are input from the corresponding amplifier unit 112, to other communication devices.

(3) Data Processing Unit 130

During reception, with respect to the received data provided from the modulation/demodulation unit 120, the data processing unit 130 has the function of analyzing the MAC header for the purpose of performing media access control (MAC) and has the function of detecting errors in the frames. On the other hand, during transmission, the data processing unit 130 generates transmission packets (data); generates transmission frames by performing operations such as adding the MAC header and the error detection code to the generated packets; and provides the transmission frames to the modulation/demodulation unit 120.

Moreover, the data processing unit 130 provides the control unit 140 with information that, from among the received data, is required in the determination operation and the transmission control operation of the control unit 140. Furthermore, the data processing unit 130 provides the memory unit 150 with information related to the data written in the RTS frames and the CTS frames.

(4) Control Unit 140

The control unit 140 has the function of controlling the abovementioned constituent elements; and performs operations such as transferring information among the constituent elements, setting parameters, and scheduling operations. For example, the control unit 140 sets parameters in the modulation/demodulation unit 120 and the signal processing unit 116, and performs scheduling of the packets in the data processing unit 130. Moreover, for example, the control unit 140 sets parameters in the radio interface unit 114 and the amplifier unit 112, and performs transmission power control.

Furthermore, in the application concerned, the control unit 140 performs a determination operation for controlling data communication and, based on the result of the determination operation, controls whether or not to perform transmission and reception of data frames.

Figure 3:
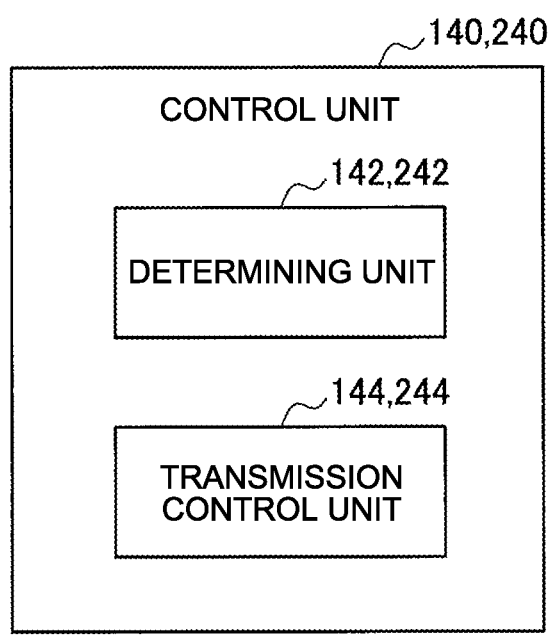
FIG. 3 is a block diagram illustrating a functional configuration example of a control unit according to the embodiment of the application concerned.

In order to implement the functions mentioned above, the control unit 140 according to the embodiment of the application concerned includes a determining unit 142 and a transmission control unit 144 as illustrated in FIG. 3.

(Determining Unit 142)

The determining unit 142 has the function of performing a determination operation for controlling data communication. More particularly, based on the result of the RTS/CTS frame exchange performed by the communication unit 110 via the control channel, the determining unit 142 determines whether or not to make the communication unit 110 transmit data frames via the data channel to other communication devices.

For example, the AP 100 transmits an RTS frame from the communication unit 110 to the STA 200 via the control channel. The determining unit 142 confirms whether or not a CTS frame is received from the STA 200 before the elapse of a predetermined period of time (for example, the SIFS time). If a CTS frame is received from the STA 200 before the elapse of the SIFS time, then the determining unit 142 determines that the data can be transmitted to the STA 200, and provides the determination result to the transmission control unit 144.

Herein, the SIFS (Short Inter Frame Space) time implies the shortest latency time in the frame transmission interval. Meanwhile, the predetermined period of time is not limited to the SIFS, and can be set to an arbitrary period of time.

Meanwhile, if a CTS frame is not received from the STA 200 before the elapse of the SIFS time, then the determining unit 142 determines that data frames cannot be transmitted to the STA 200, and provides the determination result to the transmission control unit 144. Moreover, until the determination result is obtained which indicates that data frames can be transmitted to the STA 200, the determining unit 142 makes the communication unit 110 perform the RTS frame transmission operation, and every time repeats the determination operation.

In the example given above, when the AP 100 and the STA 200 are successful in the RTS/CTS frame exchange, the AP 100 starts transmitting data frames. However, the determination condition for the AP 100 to start transmitting data frames is not limited to the example given above. Alternatively, for example, even if a CTS frame is not received before the elapse of the SIFS time since the transmission of the RTS frame, the AP 100 can start transmitting data frames. Moreover, even if an RTS frame is not yet received from the AP 100, the STA 200 can transmit a CTS frame, in which the data transmission start timing is written, to the AP 100; and thus can specify the data transmission start timing. Meanwhile, the frame used in specifying the data transmission start timing is not limited to an RTS/CTS frame. Alternatively, the STA 200 can specify the data transmission start timing using a trigger frame.

(Transmission Control Unit 144)

The transmission control unit 144 has the function of controlling the data communication. More particularly, the transmission control unit 144 has the function of controlling the channels to be used for transmitting RTS frames, CTS frames, and data frames. For example, in the embodiment of the application concerned, the transmission control unit 144 makes the communication unit 110 transmit RTS frames and CTS frames via the control channel, and transmit data frames via the data channel.

Moreover, the transmission control unit 144 also has the function of controlling, based on the determination result of the determining unit 142, whether or not to make the communication unit 110 transmit data frames. For example, when the determination result is obtained which indicates that data frames are to be transmitted, the transmission control unit 144 makes the communication unit 110 transmit data frames via the data channel.

(5) Memory Unit 150

The memory unit 150 has the function of storing information related to the data obtained by the data processing unit 130. Moreover, when the information related to the data is required in the operations of the control unit 140, the memory unit 150 provides the information to the control unit 140 via the data processing unit.

(6) Power Supply Unit 160

The power supply unit 160 is configured with a battery power supply or a fixed power supply, and has the function of supplying electrical power to the communication device.

[2-3. Information that is Communicated]

Explained below with reference to FIGS. 4 and 5 is an example of the information communicated by the AP 100 and the STA 200.

In the embodiment of the application concerned, the information communicated between communication devices is in the form of RTS frames, CTS frames, and data frames. The RTS frames represent, for example, the information transmitted by the AP 100 to the STA 200 via the control channel. The CTS frames represent the information transmitted by the STA 200 to the AP 100 via the control channel. The data frames represent the information transmitted by the AP 100 to the STA 200 via the data channel. Given below is the specific explanation of the configuration of each type of frames.

(1) RTS Frame

Explained below with reference to FIG. 4 is an example of the format of an RTS frame. In the normal configuration of an RTS frame, from among the fields illustrated in FIG. 4, for example, the fields "Frame Control", "Duration", "RA", "TA", and "FCS" are included.

An RTS frame according to the embodiment of the application concerned includes a field of additional information related to the data that is normally written in data frames. The additional information corresponds to, for example, the following fields: "Format of Data", "BSS Color of Data", "Spatial Reuse of Data", "Bandwidth of Data", and "Duration of Data". Meanwhile, this frame format is only exemplary. Given below is the explanation of each field of an RTS frame.

The "Frame Control" field includes information related to the type of frame, the transmission direction, and the frame attributes. Herein, the information indicating RTS frame as the type of frame corresponds to transmission request information. The "Duration" field includes information related to the scheduled period of using the radio link. The "RA" field includes information related to the receiving-station MAC address (RA: Receiver Address). The "TA" field includes information related to the transmitting-station MAC address (TA: Transmitter Address).

The "Format of Data" field includes format information. The "BSS Color of Data" field includes BSS identification information. The "Spatial Reuse of Data" field includes spatial reuse information.

The "Bandwidth of Data" field includes bandwidth information. The "Duration of Data" field includes transmission duration information. The "FCS" field is meant for performing error detection in the frame (FCS: Frame Check Sequence).

As a result of having the additional information related to data written in an RTS frame, the communication device at the transmitting side can provide the communication device at the receiving side with the detailed information of the data to be transmitted. Moreover, the transmission information at the receiving side becomes able to know in advance the additional information related to the data, thereby enabling achieving reduction in the overhead in the data frames in the data channel.

(2) CTS Frame

Explained below with reference to FIG. 5 is an example of the format of a CTS frame. In the normal configuration of a CTS frame, from among the fields illustrated in FIG. 5, for example, the fields "Frame Control", "RA", and "FCS" are included. In the embodiment of the application concerned, a CTS frame additionally includes a "Transmit Start Time of Data" field and a "Duration of Data" field as the fields of the information related to the data transmission start timing and the data transmission end timing. Meanwhile, this frame format is only exemplary. Given below is the explanation of each field of a CTS frame.

The "Frame Control" field includes information related to the type of frame, the transmission control, and the frame attributes. Herein, the information indicating CTS frame as the type of frame corresponds to transmission permission information. The "RA" field includes information related to the receiving-station MAC address (RA: Receiver Address).

The "Transmit Start Time of Data" field includes information related to the data transmission start timing. The "Duration of Data" field includes information related to the data transmission period. The "FCS" field is meant for performing error detection in the frame (FCS: Frame Check Sequence). Meanwhile, the data transmission end timing can be calculated from the data transmission start timing and the data transmission period.

(3) Data Frame

A data frame is a frame including the data transmitted and received by communication devices, and including additional information related to the data. In the embodiment of the application concerned, the additional information is not written in a data frame, but is written in an RTS frame. The specific fields of the additional information are same as the details explained above in (1) RTS frame. Thus, that explanation is not given again so as to avoid repetition. Although the additional information written in RTS frames is not written in data frames; the AP 100 writes, in the data frames, a "Training" field that required in the demodulation of the data frames received by the STA 200, and then transmits the data frames.

Meanwhile, the frames in which additional information related to the data is written are not limited to RTS frames, and alternatively the additional information can be written in arbitrary frames. For example, additional information related to the data can be written in CTS frames. If additional information related to the data is written in CTS frames, the communication device at the receiving side becomes able to instruct the communication device at the transmitting side to transmit the data specified in the additional information.

Explained above with reference to FIGS. 4 and 5 is an example of the information communicated between the AP 100 and the STA 200 according to the embodiment of the application concerned. Given below is the explanation of an operation example of the communication system according to the embodiment of the application concerned.

[2-4. Operation Example]

Figure 7:
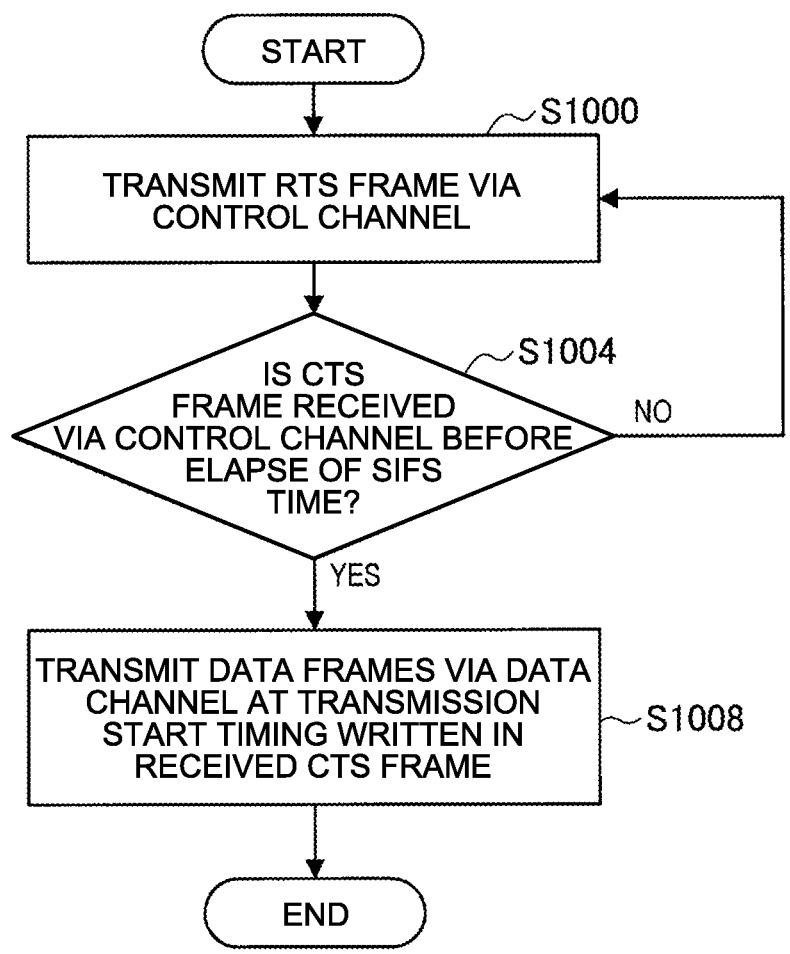
FIG. 7 is a flowchart for explaining an operation example of the communication device at the transmitting side according to the embodiment of the application concerned.
Figure 8:
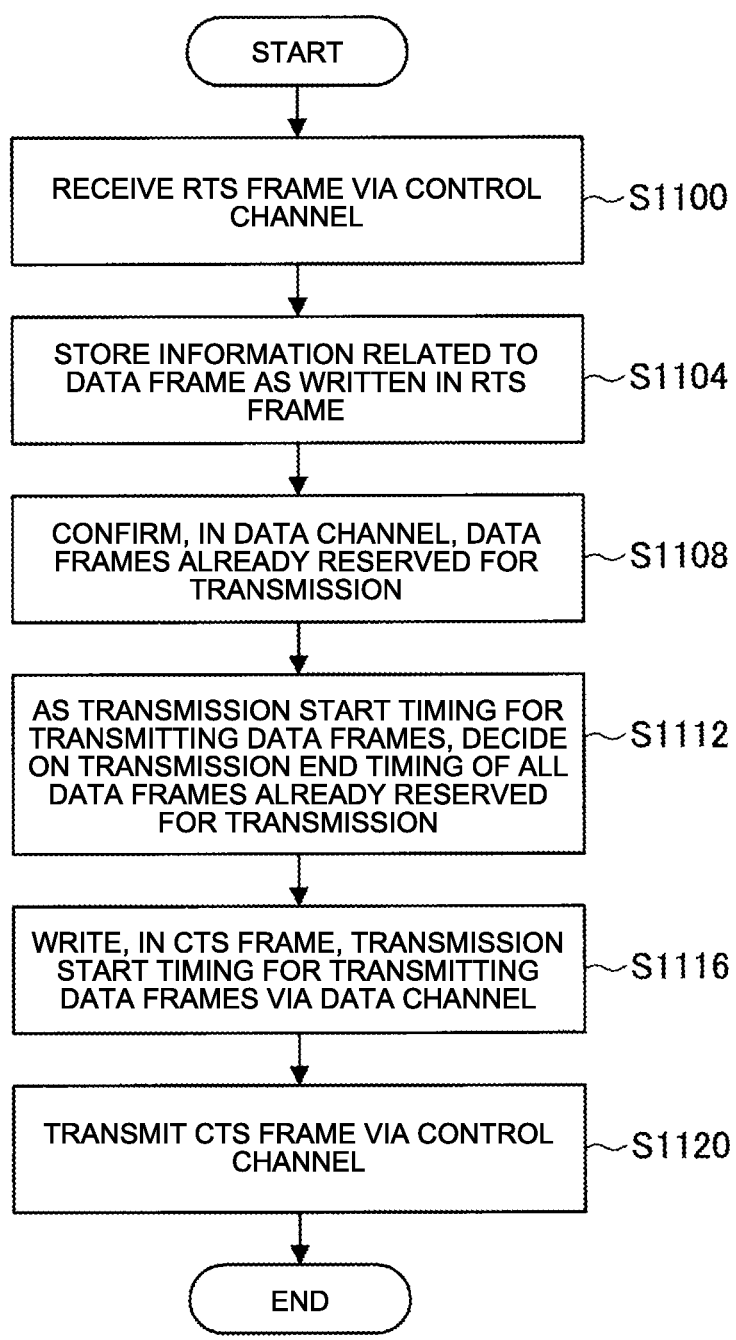
FIG. 8 is a flowchart for explaining an operation example of the communication device at the receiving side according to the embodiment of the application concerned.

The explanation is given about an operation example of the communication system according to the embodiment of the application concerned. Explained below with reference to FIGS. 6 to 8 is an operation example of the communication system.

(1) Operation Example of Communication System

Figure 6:
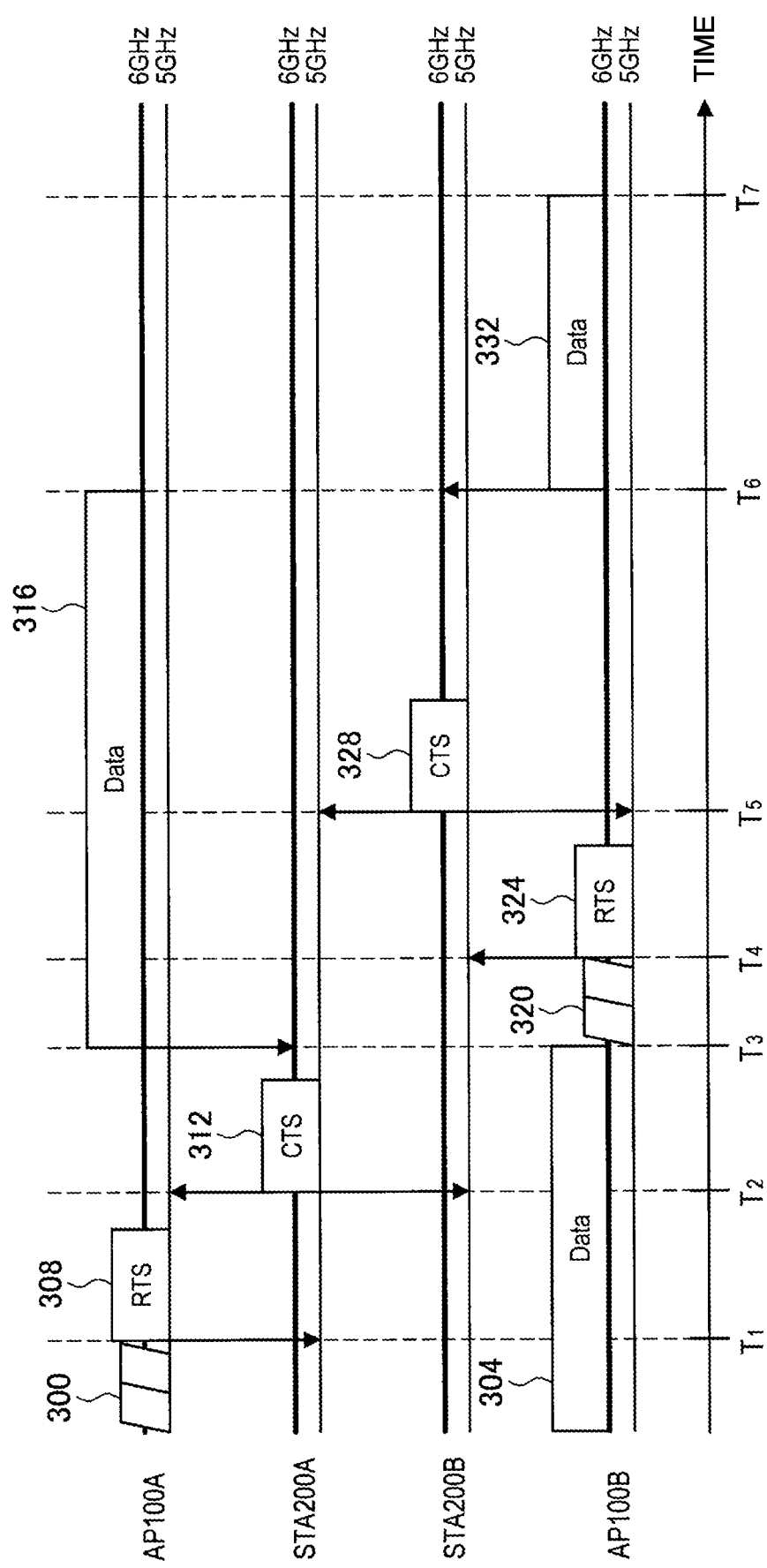
FIG. 6 is a sequence diagram illustrating an operation example of the communication system according to the embodiment of the application concerned.

Explained below with reference to FIG. 6 is an overall operation example of the communication system according to the embodiment of the application concerned. FIG. 6 is a sequence diagram illustrating the operation example of the communication system. In the embodiment of the application concerned, the operation for acquiring the data frame transmission right, which is required in the determination operation for controlling the communication of data frames, is performed using only the control channel. Moreover, the operation of communicating data frames is assumed to be performed using only the data channel.

As illustrated in FIG. 6, firstly, after the elapse of a back-off period 300, the AP 100A transmits an RTS frame 308 to the STA 200A via the control channel (a timing $T_1$). Upon receiving the RTS frame 308, the STA 200A transmits a CTS frame 312 to the AP 100A and the STA 200A via the control channel (a timing $T_2$).

At that time, since the AP 100B is using the data channel for transmitting Data 304, the AP 100A and the STA 200A cannot use the data channel. Hence, the STA 200A writes, as the transmission start time in the "Transmit Start Time of Data" field of the CTS frame, information about a timing $T_3$ at which the AP 100B would complete the transmission of data frames via the data channel; and transmits the CTS frame via the control channel. This transmission start time represents the information intended for the AP 100A that is scheduled next to transmit data frames.

Moreover, the STA 200A also writes, in the "Duration of Data" field of the CTS frame, the transmission duration information written in the "Duration of Data" field of the RTS frame received via the control channel from the AP 100A. The transmission duration information represents the information intended for the STA 200B that is likely to receive the data frames after the STA 200A. For example, assume that the STA 200B receives an RTS frame from the AP 100B while the STA 200A is receiving data frames. Then, the STA 200B can write the transmission duration information, which was written in the CTS frame received earlier from the STA 200A, in the "Duration of Data" field of a CTS frame, and transmit that CTS frame to the AP 100B.

After the AP 100B has completed the transmission of the Data 304 via the data channel (the timing $T_3$), the AP 100A starts transmitting Data 316 to the STA 200A via the data channel (the timing $T_3$). After the elapse of a back-off period 320 since the completion of transmission of the Data 304, the AP 100B sends an RTS frame 324 to the STA 200B via the control channel for the purpose of again transmitting data frames (a timing $T_4$). Upon receiving the RTS frame 324 via the control channel; the STA 200A writes, in a CTS frame 328, information that is identical to the information written when the STA 200A transmitted the CTS frame 312 via the control channel, and transmits the CTS frame 328 to the AP 100B and the STA 200A via the control channel (a timing $T_5$). Subsequently, after the AP 100A has completed the transmission of the Data 316 via the data channel (a timing $T_6$), the AP 100B transmits Data 332 to the STA 200B via the data channel (the timing $T_6$ to a timing $T_7$.

(2) Operation Example of Communication Device at Data Frame Transmitting Side

Explained below with reference to FIG. 7 is the specific RTS/CTS frame exchange operation performed in the communication device at the data frame transmitting side. In the following explanation, for example, the AP 100 is assumed to be the communication device at the transmitting side, and the STA 200 is assumed to be the communication device at the receiving side. Firstly, before starting the data frame transmission operation, the AP 100 transmits an RTS frame to the STA 200A via the control channel (Step S1000). After transmitting the RTS frame, the AP 100 confirms whether or not a CTS frame is received via the control channel before the elapse of the SIFS period (Step S1004). If a CTS frame is received (Yes at Step S1004), then the AP 100 transmits data frames to the STA 200 via the data channel at the transmission start timing written in the received CTS frame (Step S1008). On the other hand, if a CTS frame is not received (No at Step S1004), then the AP 100 repeatedly performs the operation of transmitting an RTS frame via the control channel and the determination operation until a CTS frame is received.

(3) Operation Example of Communication Device at Data Frame Receiving Side

Explained below with reference to FIG. 8 is the specific RTS/CTS frame exchange operation performed in the communication device at the data frame receiving side. In the following example, for example, in an identical manner to the explanation with reference to FIG. 7, the STA 200 is assumed to be the communication device at the receiving side, and the AP 100 is assumed to be the communication device at the transmitting side. Firstly, the STA 200 receives an RTS frame via the control channel (Step S1100). Then, the STA 200 stores, in the memory unit 150, the additional information related to the data as written in the received RTS frame (Step S1104). Subsequently, the STA 200 confirms whether the data frames that are already reserved for transmission are present in the data channel (Step S1108). Then, the STA 200 decides, as the transmission start timing for transmitting data frames, the timing at which the transmission of all data frames already reserved for transmission is completed (Step S1112). After deciding on the transmission start timing, the STA 200 writes, in a CTS frame, the transmission start timing representing the timing at which the AP 100 would start transmitting data frames via the data channel (Step S1116), and transmits the CTS frame to the AP 100 via the control channel (Step S1120).

Till now, the embodiment of the application concerned was explained with reference to FIGS. 2 to 8. Given below is the explanation of a modification example of the embodiment of the application concerned.

<3. Modification Examples>

Given below is the explanation of the modification example of the embodiment of the application concerned. The modification example explained below can be applied, either individually or in combination, in the embodiment of the application concerned. Moreover, the modification example can be applied as a substitute to or in addition to the configuration explained in the embodiment of the application concerned.

In the embodiment of the application concerned, the explanation was given for the example in which the operation of acquiring the data frame transmission right is performed using the control channel. However, alternatively, the operation of acquiring the data frame transmission right can be performed using the data channel according to a different method than the method for performing the operation using the control channel. For example, before starting the transmission of data frames, the AP 100 confirms the usage status of the data channel and the control channel. Then, according to the usage status of each channel, the AP 100 can select the channel to be used and perform the operation of acquiring the data frame transmission right according to the method corresponding to the selected channel. Explained below with reference to FIGS. 9 and 10 is an example of specific operations.

(1) Operation Example of Communication System According to Modification Example

Figure 9:
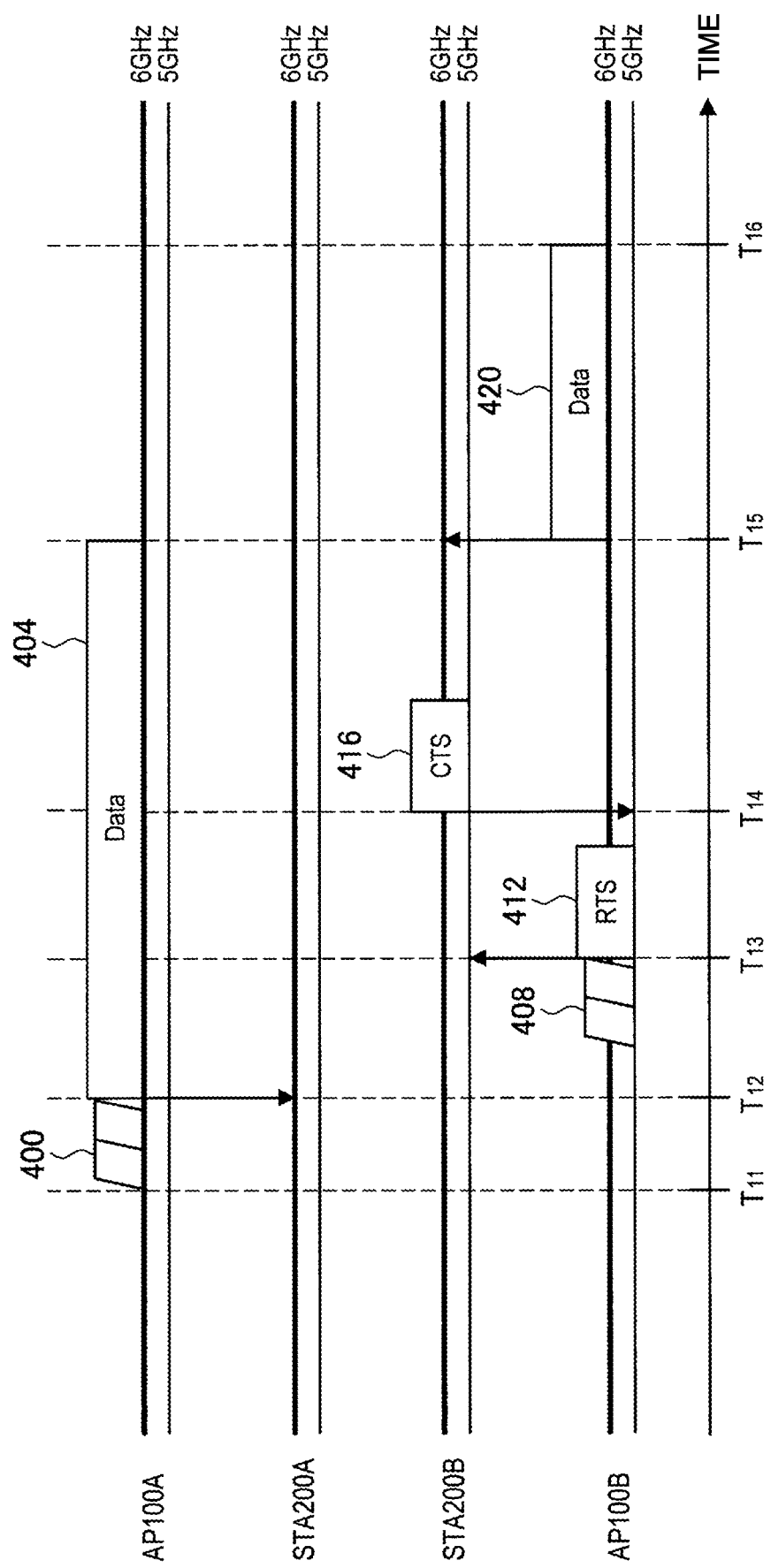
FIG. 9 is a sequence diagram illustrating an operation example of the communication system according to a modification example of the embodiment of the application concerned.
Figure 10:
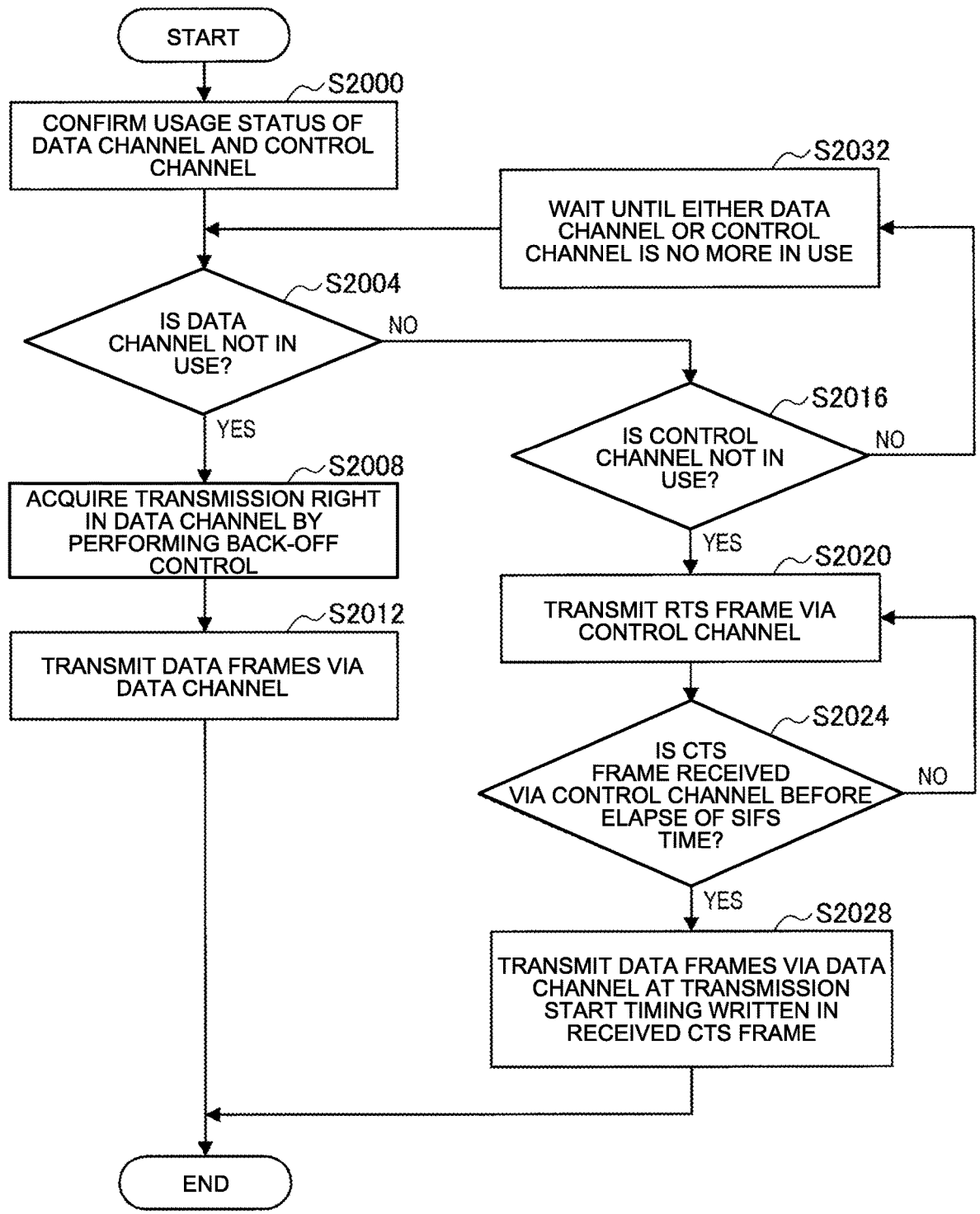
FIG. 10 is a flowchart for explaining an operation example of the communication device at the transmitting side according to the modification example of the embodiment of the application concerned.

Firstly, explained with reference to FIG. 9 is an example of specific operations performed in the communication system according to the modification example. Firstly, before transmitting data frames to the STA 200A, the AP 100A confirms the usage status of the data channel and the control channel. Since the confirmation result indicates that the data channel not in use, the AP 100A attempts to acquire the data frame transmission right in the data channel by performing back-off control 400 (a timing $T_{11}$). If the data frame transmission right is acquired as a result of the back-off control 400, the AP 100A transmits Data 404 to the STA 200A via the data channel (a timing $T_{12}$ to a timing $T_{15}$). Meanwhile, when the data channel transmission right is acquired, the AP 100 and the STA 200A does not perform the RTS/CTS frame exchange, and thus the AP 100 does not send the additional information to the STA 200A. Hence, the AP 100 can write the additional information in the data frames.

While the AP 100A is transmitting the data frames via the data channel; with the aim of attempting transmission of data frames, the AP 100B confirms the usage status of the data channel and the control channel before starting transmission of data frames. The confirmation result enables the AP 100B to know that the data channel is being used by some other communication device. At the same time, the AP 100B gets to know that the control channel is not in use and, after the elapse of a back-off period 408, transmits an RTS frame 412 to the STA 200B via the control channel (the timing $T_{13}$). Then, based on the information written in the received RTS frame 412, the STA 200B transmits a CTS frame 416 to the AP 100B via the control channel (the timing $T_{14}$). Based on the information written in the received CTS frame 416, after the AP 100A has completed the transmission of the Data 404 via the data channel (the timing $T_{15}$), the AP 100B transmits Data 420 to the STA 200B via the data channel (the timing $T_{15}$ to a timing $T_{16}$).

(2) Operation Example of Communication Device at Data Frame Transmitting Side According to Modification Example Explained below with reference to FIG. 10 is the specific data transmission operation performed in the communication device at the data frame transmitting side according to the modification example. In the following example, for example, the AP 100 is assumed to be the communication device at the transmitting side. Firstly, before starting the data frame transmission operation, the AP 100 confirms the usage status of the data channel and the control channel (Step S2000). If the data channel is not in use (Yes at Step S2004), then the AP 100 acquires the data frame transmission right in the data channel by performing back-off control (Step S2008). After acquiring the data frame transmission right, the AP 100 transmits data frames in the data channel (Step S2012).

Meanwhile, if the data channel is in use (No at Step S2004), the AP 100 confirms the usage status of the control channel (Step S2016). If the control channel is not in use (Yes at Step S2016), then the AP 100 transmits an RTS frame via the control channel (Step S2020). Subsequently, before the elapse of the SIFS period since the transmission of the RTS frame, if a CTS frame is received via the control channel (Yes at Step S2024); then the AP 100 transmits data frames. More particularly, the AP 100 transmits data frames via the data channel at the transmission start timing written in the received CTS frame (Step S2028). On the other hand, before the elapse of the SIFS period since the transmission of the RTS frame, if a CTS frame is not received via the control channel (No at Step S2024); then the AP 100 again transmits an RTS frame via the control channel (Step S2020).

If the control channel too is in use (No at Step S2016), then the AP 100 waits until either the data channel or the control channel is no more in use (Step S2032).

(3) Operation Example of Communication Device at Data Frame Receiving Side According to Modification Example The operation example of the communication device at the data frame transmitting side according to the modification example is identical to the operation example of the communication device at the data frame transmitting side, and the explanation thereof is not given so as to avoid repetition.

Till now, the explanation with reference to FIGS. 9 and 10 was given about the modification example of the application concerned. Given below is the explanation of the application examples according to the embodiment of the application concerned.

<4. Application Examples>

The technology according to the application concerned is applicable in various products. For example, each STA 200 can be implemented as a mobile device such as a smartphone, a tablet PC (Personal Computer), a note PC, a portable game terminal, or a digital camera; or can be implemented as a fixed terminal such as a television receiver, a printer, a digital scanner, or a network storage; or can be implemented as an in-vehicle terminal such as a car navigation device. Alternatively, the STAs 200 can be implemented as terminals performing M2M (Machine To Machine) communication (also called MTC (Machine Type Communication) terminals), such as smart meters, automatic vending machines, remote supervision devices, or POS (Point Of Sale) terminals. Still alternatively, the STAs 200 can be radio communication modules (for example, integrated circuit modules configured using a single die) installed on such terminals.

On the other hand, for example, each AP 100 can be implemented as a wireless LAN access point (also called a wireless base station) that may or may not have the routing function. Alternatively, the APs 100 can be implemented as mobile wireless LAN routers. Still alternatively, the APs 100 can be radio communication modules (for example, integrated circuit modules configured using a single die) installed on such devices.

[4-1. First Application Example]

Figure 11:
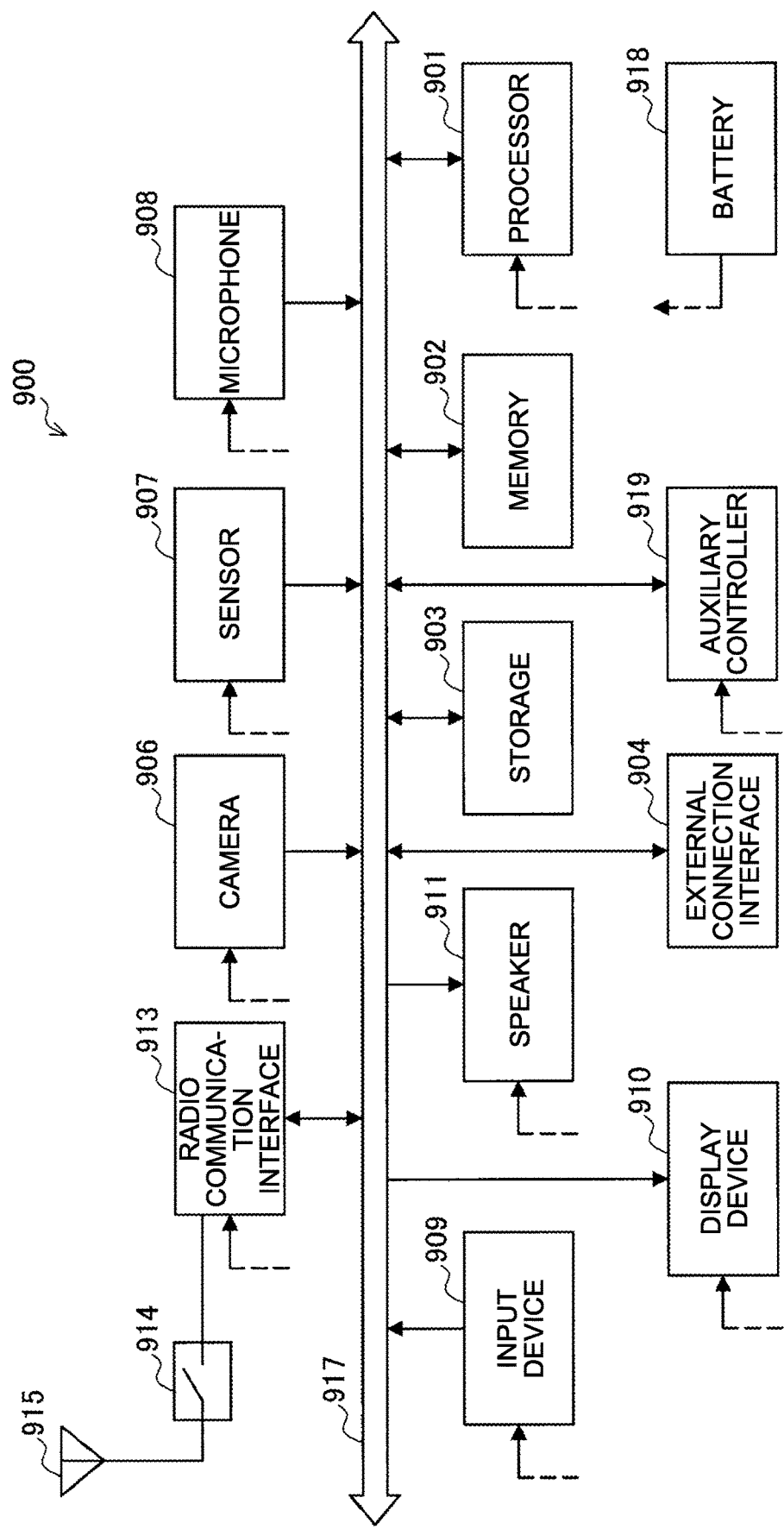
FIG. 11 is a block diagram illustrating an example of a schematic configuration of a smartphone.

FIG. 11 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a radio communication interface 913, an antenna switch 914, an antenna 915, a bus 917, a battery 918, and an auxiliary controller 919.

The processor 901 can be, for example, a CPU (Central Processing Unit) or an SoC (System on Chip), and controls the functions of the application layer and the other layers of the smartphone 900. The memory 902 includes a RAM (Random Access Memory) and a ROM (Read Only Memory), and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sound input to the smartphone 900 into sound signals. The input device 909 includes, for example, a touch sensor for detecting a touch on the screen of the display device 910, or a keypad, or a keyboard, or buttons or switches; and receives operations and information input from the user. The display device 910 has a screen such as a liquid crystal display (LCD) or an organic light emitting diode (OLED) display, and displays output images of the smartphone 900. The speaker 911 converts the sound signals, which are output from the smartphone 900, into sound.

The radio communication interface 913 supports one or more wireless LAN standards such as the IEEE802.11a standard, the IEEE802.11b standard, the IEEE802.11g standard, the IEEE802.11n standard, the IEEE802.11ac standard, and the IEEE802.11ad standard; and implements radio communication. In the infrastructure mode, the radio communication interface 913 can perform communication with other devices via wireless LAN access points. Moreover, in a direct communication mode such as the ad hoc mode or the Wi-Fi Direct (registered trademark), the radio communication interface 913 can directly perform communication with other devices. Moreover, in the Wi-Fi Direct, unlike in the ad hoc mode, although one of the two terminals functions as an access point, the communication between those two terminals is performed in a direct manner. Typically, the radio communication interface 913 can include a baseband processor, an RF (Radio Frequency) circuit, and a power amplifier. Meanwhile, the radio communication interface 913 can be a one-chip module in which a memory for storing a communication control program, a processor for executing that program, and related circuits are integrated. Moreover, in addition to supporting the wireless LAN method, the radio communication interface 913 can also support other types of radio communication methods such as the near field communication method, the proximity radio communication method, and the cellular communication method. The antenna switch 914 switches the connection destinations of the antenna 915 among a plurality of circuits included in the radio communication interface 913 (for example, the circuits meant for different radio communication methods). The antenna 915 includes one or more antenna elements (for example, a plurality of antenna elements constituting a MIMO antenna), and is used by the radio communication interface 913 in transmitting and receiving radio signals.

Meanwhile, the smartphone 900 is not limited to have the configuration illustrated in the example in FIG. 11, and can alternatively include a plurality of antennas (for example, an antenna for the wireless LAN and an antenna for the proximity radio communication method). In that case, the antenna switch 914 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 913, and the auxiliary controller 919 to each other. The battery 918 supplies electrical power to each block of the smartphone 900, which is illustrated in FIG. 11, via a power supply line that is partially illustrated in FIG. 11 using dashed lines. The auxiliary controller 919 implements the minimum required functions of the smartphone 900 in, for example, the sleep mode.

Meanwhile, in the smartphone 900, the processor 901 can execute the access point function at the application level, so that the smartphone 900 can operate as a wireless access point (software AP). Moreover, the radio communication interface 913 can also have the wireless access point function.

[4-2. Second Application Example]

Figure 12:
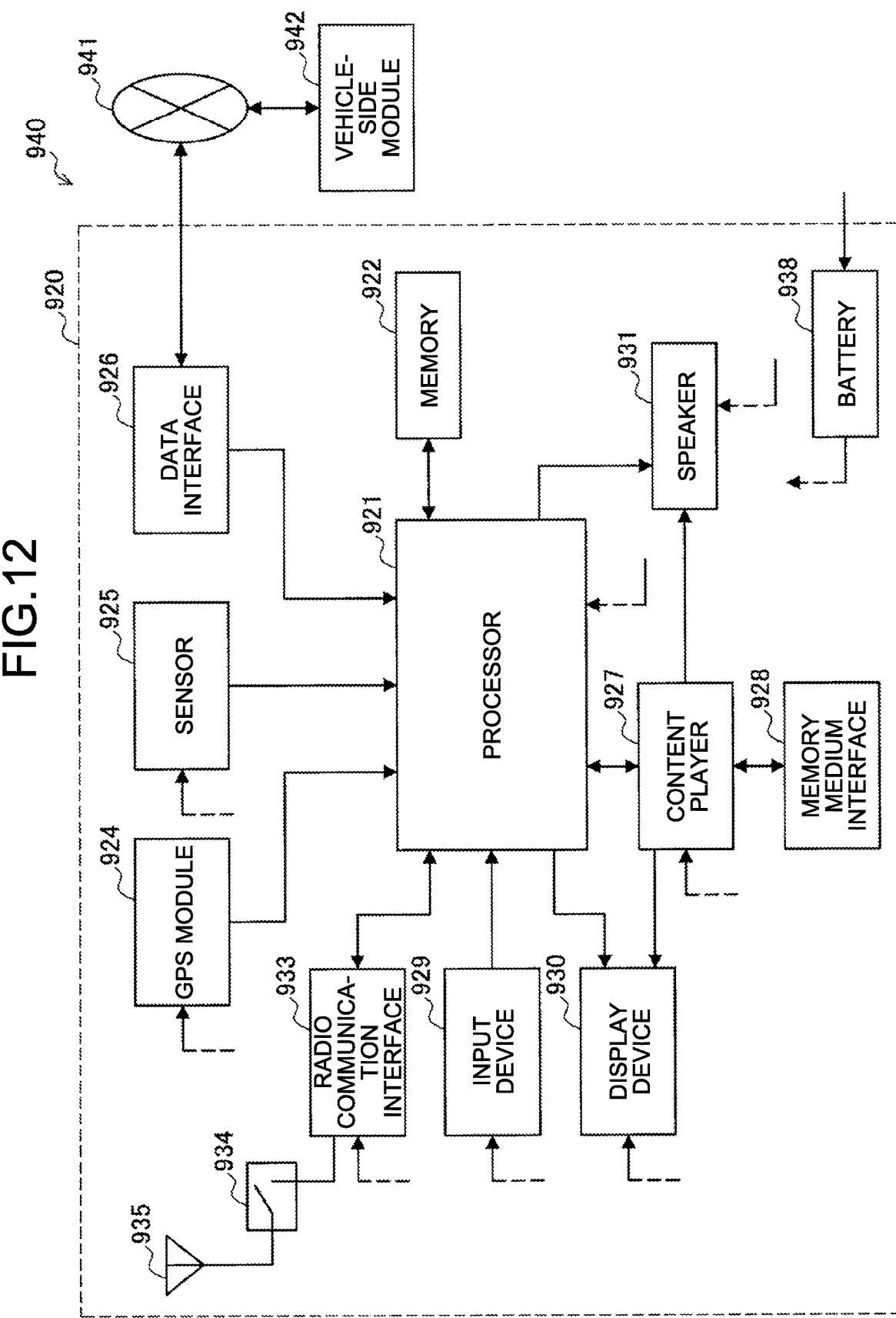
FIG. 12 is a block diagram illustrating an example of a schematic configuration of a car navigation device.

FIG. 12 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a radio communication interface 933, an antenna switch 934, an antenna 935, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, or includes buttons, or includes switches; and receives operations and information input from the user. The display device 930 has a screen such as an LCD or an OLED display, and displays the navigation functions or images of the reproduced contents. The speaker 931 converts the sounds of the navigation functions or the sounds of the reproduced contents.

The radio communication interface 933 supports one or more wireless LAN standards such as the IEEE802.11 a standard, the IEEE802.11b standard, the IEEE802.11g standard, the IEEE802.11n standard, the IEEE802.11ac standard, and the IEEE802.11ad standard; and implements radio communication. In the infrastructure mode, the radio communication interface 933 can perform communication with other devices via wireless LAN access points. Moreover, in a direct communication mode such as the ad hoc mode or the Wi-Fi Direct, the radio communication interface 933 can directly perform communication with other devices. Typically, the radio communication interface 933 can include a baseband processor, an RF circuit, and a power amplifier. Meanwhile, the radio communication interface 933 can be a one-chip module in which a memory for storing a communication control program, a processor for executing that program, and related circuits are integrated. Moreover, in addition to supporting the wireless LAN method, the radio communication interface 933 can also support other types of radio communication methods such as the near field communication method, the proximity radio communication method, and the cellular communication method. The antenna switch 934 switches the connection destinations of the antenna 935 among a plurality of circuits included in the radio communication interface 933. The antenna 935 includes one or more antenna elements, and is used by the radio communication interface 933 in transmitting and receiving radio signals.

Meanwhile, the car navigation device 920 is not limited to have the configuration illustrated in the example in FIG. 12, and can alternatively include a plurality of antennas. In that case, the antenna switch 934 can be omitted from the configuration of the car navigation device 920.

The battery 938 supplies electrical power to each block of the car navigation device 920, which is illustrated in FIG. 12, via a power supply line that is partially illustrated in FIG. 12 using dashed lines. Moreover, the battery 938 stores the electrical power supplied from the vehicle.

Meanwhile, the radio communication interface 933 can operate as the AP 100, and can provide wireless connection to the terminal of the user who is riding in the vehicle.

Moreover, the technology disclosed in the application concerned can be implemented as an in-vehicle system (or a vehicle) 940 that includes one or more blocks of the car navigation device 920; the in-vehicle network 941; and a vehicle-side module 942. The vehicle-side module 942 generates vehicle data such as the vehicle speed, the engine rotation count, and breakdown information; and outputs the generated data to the in-vehicle network 941.

[4-3. Third Application Example]

FIG. 13 is a block diagram illustrating an example of a schematic configuration of a wireless access point 950 in which the technology disclosed in the application concerned is applicable. The wireless access point 950 includes a controller 951, a memory 952, an input device 954, a display device 955, a network interface 957, a radio communication interface 963, an antenna switch 964, and an antenna 965.

The controller 951 can be, for example, a CPU or a DSP (Digital Signal Processor), and implements various functions (for example, access restriction, routing, encryption, firewall, and log management) of the IP (Internet Protocol) layer and the still higher-level layers. The memory 952 includes a RAM and a ROM, and is used to store the programs executed by the controller 951 and to store a variety of control data (for example, a terminal list, a routing table, an encryption key, security setting, and a log).

The input device 954 includes, for example, buttons or switches, and receives operations from the user. The display device 955 includes an LED lamp, and displays the operation status of the wireless access point 950.

The network interface 957 is a wired communication interface meant for enabling the wireless access point 950 to get connected to a wired communication network 958. The network interface 957 can include a plurality of connection terminals. The wired communication network 958 can be a LAN such as Ethernet (registered trademark), or can be a WAN (Wide Area Network).

The radio communication interface 963 supports one or more wireless LAN standards such as the IEEE802.11a standard, the IEEE802.11b standard, the IEEE802.11g standard, the IEEE802.11n standard, the IEEE802.11ac standard, and the IEEE802.11ad standard; and provides wireless connection as an access point to nearby terminals. Typically, the radio communication interface 963 can include a baseband processor, an RF circuit, and a power amplifier. Meanwhile, the radio communication interface 963 can be a one-chip module in which a memory for storing a communication control program, a processor for executing that program, and related circuits are integrated. The antenna switch 964 switches the connection destinations of the antenna 965 among a plurality of circuits included in the radio communication interface 963. The antenna 965 includes one or more antenna elements, and is used by the radio communication interface 963 in transmitting and receiving radio signals.

<5. Summary>

As described above, the communication devices according to the application concerned can perform the RTS/CTS frame exchange via the control channel, and can communicate data frames via the data channel that has a different frequency band than the control channel. As a result, it is possible to provide a communication device, a program, and a communication method in a new and improved form for enabling radio communication in a more efficient manner.

Although the application concerned is described above in detail in the form of a preferred embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth.

Meanwhile, the series of operations performed by each device described in the present written description can be implemented using either software, or hardware, or a combination of software and hardware. The computer programs constituting software are, for example, stored in advance in the concerned device or in an external recording medium (non-transitory media). Then, for example, during execution in the computer, each program is read into the RAM and is executed by the processor such as the CPU.

Meanwhile, the operations explained with reference to the flowcharts and the sequence diagrams in the present written description need not necessarily be performed in the order illustrated in drawings. That is, some of the operation steps can be performed in parallel. Moreover, additional operation steps can be included, and some of the operation steps can be omitted.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)
  A communication device comprising:
    a first communication unit that performs frame exchange with other communication device using a first channel and based on IEEE802.11 standard;
    a second communication unit that performs communication of data frame with the other communication device using a second channel which has different frequency band than the first channel; and
    a control unit that controls communication of the data frame based on result of the frame exchange.

(2)
  The communication device according to (1), wherein the first communication unit performs transmission and reception of a first-type frame, which is a frame including transmission request information, and a second-type frame, which is a frame including transmission permission information, with the other communication device.

(3)

The communication device according to (2), wherein the first-type frame includes additional information related to the data frame.

(4)

The communication device according to (3), wherein the additional information represents information included in at least one of a "Format of Data" field, a "BSS Color of Data" field, a "Spatial Reuse of Data" field, a "Bandwidth of Data" field, and a "Duration of data" field.

(5)

The communication device according to (2), wherein the second-type frame includes transmission start timing for transmitting the data frame from the second communication unit to the other communication device.

(6)

The communication device according to any one of (1) to (5), wherein, based on result of the frame exchange performed by the first communication unit, when it is determined that the data frame is transmittable to the other communication device, the control unit makes the second communication device transmit the data frame to the other communication device.

(7)

The communication device according to (6), wherein, after the first communication unit has transmitted a first-type frame to the other communication device, when a second-type frame is received from other communication device within predetermined period of time, the control unit makes the second communication unit transmit the data frame to the other communication device.

(8)

The communication device according to (6), wherein, when the first communication unit receives a first-type frame from other communication device, the control unit decides on transmission start timing and makes the first communication unit transmit a second-type frame including the transmission start timing to the other communication device.

(9)

The communication device according to any one of (1) to (8), wherein the second communication unit receives the data frame transmitted from the other communication device, and based on instruction from the control unit, transmits the data frame to the other communication unit.

(10)

The communication device according to (9), wherein the second communication unit transmits the data frame that does not include additional information.

(11)

The communication device according to any one of (1) to (10), wherein the first communication unit performs frame exchange with other communication device according to RTS/CTS frame exchange.

(12)

A program that causes a computer to function as:
a first communication unit that performs frame exchange with other communication device using a first channel and based on IEEE802.11 standard;
a second communication unit that performs communication of data frame with the other communication device using a second channel which has different frequency band than the first channel; and
a control unit that controls communication of the data frame based on result of the frame exchange.

(13)

A communication method implemented in a processor, comprising:
performing frame exchange with other communication device using a first channel and based on IEEE802.11 standard;
performing communication of data frame with the other communication device using a second channel which has different frequency band than the first channel; and
controlling communication of the data frame based on result of the frame exchange.

REFERENCE SIGNS LIST

100 AP
110 communication unit
111 antenna
112 amplifier unit
114 radio interface unit
116 signal processing unit
118 channel estimating unit
120 modulation/demodulation unit
130 data processing unit
140 control unit
142 determining unit
144 transmission control unit
150 memory unit
160 power supply unit
200 STA

The invention claimed is:

1. A communication device comprising:
a first communication circuit that performs a frame exchange with a second communication device using a first channel and based on IEEE802.11 standard,
wherein the frame exchange includes receiving a Request-to-Send (RTS) frame from the second communication device and transmitting, in response to the RTS frame, a Clear-to-Sent (CTS) frame to the second communication device,
wherein the RTS frame includes each of a "Format of Data" field, a "BSS Color of Data" field, a "Spatial Reuse of Data" field, a "Bandwidth of Data" field, and a RTS "Duration of data" field, and
wherein the CTS frame includes each of a "Transmission Start Time of Data" field and a CTS "Duration of data" field;
a second communication circuit that receives a data frame from the second communication device using a second channel which has different frequency band than the first channel; and
a control circuit that controls the frame exchange, and sets a value of the "Transmission Start Time of Data" field, based on a CTS frame of a third communication device, to avoid a transmission of the data frame during a data exchange between the third communication device and a fourth communication device.

2. A non-transitory computer readable program product that contains instructions that causes a computer to function as:
a first communication circuit that performs a frame exchange with a second communication device using a first channel and based on IEEE802.11 standard,
wherein the frame exchange includes receiving a Request-to-Send (RTS) frame from the second communication device and transmitting, in response to the RTS frame, a Clear-to-Sent (CTS) frame to the second communication device, wherein the RTS frame includes each of a "Format of Data" field, a "BSS Color of Data" field, a "Spatial Reuse of Data" field, a "Bandwidth of Data" field, and a RTS "Duration of data" field, and wherein the CTS frame includes each of a "Transmission Start Time of Data" field and a CTS "Duration of data" field;

a second communication circuit that receives a data frame from the second communication device using a second channel which has different frequency band than the first channel; and a control circuit that controls the frame exchange, and sets a value of the "Transmission Start Time of Data" field, based on a CTS frame of a third communication device, to avoid a transmission of the data frame during a data exchange between the third communication device and a fourth communication device.

3. A communication method implemented in a processor, the method comprising:

performing a frame exchange with a second communication device using a first channel and based on IEEE802.11 standard, wherein the frame exchange includes receiving a Request-to-Send (RTS) frame from the second communication device and transmitting, in response to the RTS frame, a Clear-to-Sent (CTS) frame to the second communication device, wherein the RTS frame includes each of a "Format of Data" field, a "BSS Color of Data" field, a "Spatial Reuse of Data" field, a "Bandwidth of Data" field, and a RTS "Duration of data" field, and wherein the CTS frame includes each of a "Transmission Start Time of Data" field and a CTS "Duration of data" field;

receiving a data frame from the second communication device using a second channel which has different frequency band than the first channel; and controlling the frame exchange, and setting a value of the "Transmission Start Time of Data" field, based on a CTS frame of a third communication device, to avoid a transmission of the data frame during a data exchange between the third communication device and a fourth communication device.

* * * * *